(12) United States Patent
Haeusler et al.

(10) Patent No.: US 11,502,360 B2
(45) Date of Patent: Nov. 15, 2022

(54) BATTERY HOUSING FOR A TRACTION BATTERY

(71) Applicant: Mahle International GmbH, Stuttgart (DE)

(72) Inventors: Ingo Haeusler, Esslingen (DE); Ruediger Knauss, Kernen I.r. (DE); Peter Nowak, Stuttgart (DE); Karl-Ulrich Schmid-Walderich, Tuebingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/121,921

(22) Filed: Sep. 5, 2018

(65) Prior Publication Data

US 2019/0074495 A1 Mar. 7, 2019

(30) Foreign Application Priority Data

Sep. 5, 2017 (DE) ...................... 10 2017 215 609.0

(51) Int. Cl.
*H01M 50/20* (2021.01)
*B60K 11/02* (2006.01)
(Continued)

(52) U.S. Cl.
CPC .............. *H01M 50/20* (2021.01); *B60K 1/04* (2013.01); *B60K 11/02* (2013.01);
(Continued)

(58) Field of Classification Search
CPC ............. H01M 2/1083; H01M 10/613; H01M 10/625; H01M 10/6556; H01M 10/6567;
(Continued)

(56) References Cited

U.S. PATENT DOCUMENTS 8,859,126 B2 10/2014 Yamada
9,033,078 B2 5/2015 Fillion et al.
(Continued)

FOREIGN PATENT DOCUMENTS

CN 102463881 A 5/2012
CN 102945989 A 2/2013
(Continued)

OTHER PUBLICATIONS

English abstract for DE-102011107007.
(Continued)

*Primary Examiner* — Milton I Cano
*Assistant Examiner* — Mary G Henshaw
(74) *Attorney, Agent, or Firm* — Fishman Stewart PLLC

(57) ABSTRACT

A battery housing for a traction battery may include a first housing part and a second housing part fixed removably to each other. Battery modules of the traction battery may be fixable on the first housing part. The housing may also include a reinforcing structure having a plurality of reinforcing ribs reinforcing the first housing part, and a ducted structure with a plurality of coolant ducts for a coolant fixed on the first housing part. The plurality of coolant ducts may each be connectable to a respective temperature-control unit of a battery module in a coolant-conducting fashion. At least one of the coolant ducts may be at least partially embedded in one of the reinforcing ribs.

20 Claims, 2 Drawing Sheets

(51) Int. Cl.
  *H01M 10/6567* (2014.01)
  *H01M 10/613* (2014.01)
  *H01M 10/625* (2014.01)
  *H01M 10/6556* (2014.01)
  *B60K 1/04* (2019.01)
  *B60K 1/00* (2006.01)

(52) U.S. Cl.
  CPC ....... *H01M 10/613* (2015.04); *H01M 10/625* (2015.04); *H01M 10/6556* (2015.04); *H01M 10/6567* (2015.04); *B60K 2001/005* (2013.01); *B60K 2001/0438* (2013.01); *B60Y 2306/01* (2013.01); *H01M 2220/20* (2013.01)

(58) Field of Classification Search
  CPC ..... H01M 2200/20; B60K 11/02; B60K 1/04; B60K 2001/005; B60Y 2306/01
  See application file for complete search history.

(56) References Cited

U.S. PATENT DOCUMENTS

| | | | | |
|---|---|---|---|---|
| 9,954,259 | B1* | 4/2018 | Grace | B60L 58/27 |
| 9,972,873 | B2* | 5/2018 | Chung | H01M 50/20 |
| 10,096,869 | B2* | 10/2018 | Zheng | H01M 10/625 |
| 10,340,564 | B2 | 7/2019 | Nishikawa et al. | |
| 2008/0295535 | A1* | 12/2008 | Robinet | B60H 1/00278 |
| | | | | 62/259.2 |
| 2014/0060944 | A1* | 3/2014 | Fillion | B60K 1/04 |
| | | | | 180/65.31 |
| 2017/0012330 | A1 | 1/2017 | Kim et al. | |
| 2017/0025592 | A1 | 1/2017 | Hsu | |
| 2019/0252741 | A1* | 8/2019 | Gunther | H01M 2/1077 |

FOREIGN PATENT DOCUMENTS

| | | |
|---|---|---|
| CN | 103492208 A | 1/2014 |
| CN | 106571503 A | 4/2017 |
| CN | 206076339 U | 4/2017 |
| CN | 106688137 A | 5/2017 |
| CN | 206379394 U | 8/2017 |
| DE | 102012206495 A1 | 11/2012 |
| DE | 102011107007 A1 | 1/2013 |
| JP | 2013120690 A | 6/2013 |
| KR | 101690234 B1 * | 12/2016 |
| WO | 2017025592 A1 | 2/2017 |

OTHER PUBLICATIONS

English abstract for DE-102012206495.
Chinese Office Action dated Nov. 29, 2021 for copending Chinese Patent Appl. No. 201810955168.6 (with English translation).
Chinese Search Report dated Nov. 20, 2021 for copending Chinese Patent Appl. No. 201809551686.

* cited by examiner

BATTERY HOUSING FOR A TRACTION BATTERY

CROSS REFERENCE TO RELATED APPLICATIONS

This application claims priority to German Patent Application No. DE-10 2017 215 609.0, filed Sep. 5, 2017, the contents of which are hereby incorporated by reference in its entirety.

TECHNICAL FIELD

The invention relates to a battery housing for a traction battery, in particular for an electric or hybrid vehicle. The invention also relates to a traction battery with the battery housing.

BACKGROUND

Traction batteries for electric or hybrid vehicles are already known from the prior art. A traction battery usually comprises a plurality of battery modules in which a plurality of individual cells are connected to one another in parallel or in series. The battery modules are arranged and usually removably fixed in a two-part battery housing. In order to temperature-control the battery modules, a coolant system is usually arranged in the battery housing of the traction battery. The heat generated in the battery modules can be passed to a coolant in the coolant system and the battery modules can be cooled in this way. Alternatively, in the case of a low external temperature, the battery modules can also be heated by the hotter coolant.

The coolant system can here comprise, for example, a single coolant module which is arranged so that it bears against the battery modules and can transfer heat to it. There is thus no distribution of the coolant to the individual battery modules. Such a coolant system is described, for example, in DE 10 2012 206 495 A1. Alternatively, in the coolant system the coolant can be conducted to the individual battery modules, and the individual battery modules can accordingly be individually cooled or heated. The coolant is thus not distributed through a ducted structure which comprises a plurality of supply and return tubes. The respective battery modules then each have a temperature-control unit by means of which the respective battery module can be temperature-controlled. The supply and return tubes in such a coolant system are fixed in the battery housing and are connected in a coolant-conducting fashion to the respective temperature-control units when the battery modules are mounted. Individual inlet and outlet nozzles of the ducted structure are thus connected to the individual inlet and outlet nozzles of the individual temperature-control units via individual hoses. The supply and return pipes, the individual inlet and outlet nozzles, and the hoses must be arranged accessibly in the battery housing, as a result of which the coolant system requires a large amount of structural space. The battery housing accordingly also needs to be adapted.

The object of the invention is therefore to provide an improved or at least alternative embodiment for a battery housing of the generic type in which the described advantages are overcome.

This object is achieved according to the invention by the subject of the independent claims. Advantageous embodiments are the subject of the dependent claims.

SUMMARY

The present invention is based on the general concept of combining or integrating with one another individual structures of a battery housing for a traction battery, in particular for an electric or hybrid vehicle, which have up until now been separate, and consequently reducing the structural space required for the individual structures in the battery housing. The battery housing here has a first housing part and a second housing part which are fixed removably to each other. The first housing part is moreover reinforced by means of a reinforcing structure having a plurality of reinforcing ribs. A plurality of battery modules of the traction battery, each with a temperature-control unit, can be fixed on the first housing part, and a ducted structure with a plurality of coolant ducts for a coolant is fixed on said first housing part. The plurality of coolant ducts can here be connected to the respective temperature-control units in a coolant-conducting fashion. According to the invention, at least one coolant duct of the ducted structure is embedded in a reinforcing rib of the reinforcing structure at least in places.

The ducted structure with the plurality of coolant ducts is fixed in the battery housing according to the invention. The plurality of coolant ducts are connected in coolant-conducting fashion to the individual temperature-control units of the respective battery modules so that the coolant in the respective temperature-control unit and the respective battery module can exchange heat. In this way, the respective battery module can be temperature-controlled, i.e. cooled or heated. The battery modules with the temperature-control units can be fixed in the first housing part which is reinforced by the reinforcing structure with the reinforcing ribs. According to the invention, at least one coolant duct of the ducted structure is embedded in the reinforcing rib of the reinforcing structure at least in places. The at least one embedded coolant duct is thus designed at least in places in the reinforcing rib and surrounded by material of the reinforcing rib. As a result, in the battery housing according to the invention, the ducted structure is integrated at least partially in the reinforcing structure, and the structural space required for the ducted structure is advantageously reduced compared with a conventional ducted structure with supply and return pipes. In addition, in the battery housing according to the invention, the complexity and cost of manufacture can be significantly reduced and the battery housing can have a more compact and lighter design.

It is advantageously provided that a plurality of the coolant ducts of the ducted structure are individual feed ducts and individual return ducts which can incorporate the respective temperature-control units individually in the ducted structure in a coolant-conducting fashion. It is moreover provided that a plurality of the coolant ducts of the ducted structure are at least one distributing feed duct and at least one collecting return duct. The at least one distributing feed duct here leads into the plurality of individual feed ducts, and the plurality of individual return ducts open into the at least one collecting return duct.

In the ducted structure, the coolant flows first through the at least one distributing feed duct to the individual feed ducts. The individual feed ducts can be connected in coolant-conducting fashion in each case individually to the respective temperature-control units so that the coolant can be conducted from the respective individual feed ducts into the respective temperature-control units of the individual battery modules. The respective battery module can then exchange heat with the coolant in the corresponding temperature-control unit and consequently heated or cooled. The respective temperature-control units can be connected in coolant-conducting fashion in each case individually to the respective individual return ducts so that the coolant can be conducted from the respective temperature-control unit into the respective individual return duct. The respective individual return ducts open into the at least one collecting return duct and the coolant is conducted from the ducted structure, for example to a coolant cooler or alternatively to a heater. The cooled or heated coolant can then be conducted into the ducted structure and, through the distributing feed duct and through the respective individual feed ducts, back into the respective temperature-control units.

The number of individual feed ducts and the number of individual return ducts advantageously correspond respectively to the number of temperature-control units so that the respective temperature-control units can in each case be incorporated individually into the ducted structure. The number of distributing feed ducts and the number of collecting return ducts can here differ depending on the arrangement of the temperature-control units and according to the battery modules in the battery housing. If the battery modules are arranged in the battery housing in, for example, a row of modules, the latter can be arranged between the single distributing feed duct and the single collecting return duct. The individual feed ducts and the individual return ducts can then connect the individual temperature-control units of the battery modules to the distributing feed duct and the collecting return duct in a coolant-conducting fashion. If the battery modules are arranged in a plurality of rows of modules in the battery housing, a plurality of distributing feed ducts and a plurality of collecting return ducts can be provided. Each of the rows of modules here advantageously adjoins in each case a distributing feed duct and a collecting return duct. Here too, the individual temperature-control units of the battery modules can then be connected in coolant-conducting fashion to the distributing feed duct and the collecting return duct by the individual feed ducts and the individual return ducts. The respective distributing feed ducts and the respective collecting feed ducts are connected to one another advantageously in a coolant-conducting fashion so that the coolant can be conducted out of and into the ducted structure.

In a development of the battery housing according to the invention, it is advantageously provided that a plurality of the reinforcing ribs of the reinforcing structure are longitudinal ribs. The at least one distributing feed duct and/or the at least one collecting return duct can then in each case be embedded in one of the longitudinal ribs at least in places. In this way, the at least one distributing feed duct and the at least one collecting return duct are integrated in the reinforcing structure and the structural space required for the ducted structure is advantageously reduced. The longitudinal ribs can be fixed in the battery housing in such a way that the battery modules fixed in the battery housing can form a row of modules or a plurality of rows of modules. The respective rows of modules are then advantageously fixed between the individual longitudinal ribs of the reinforcing structure.

It is advantageously provided that a plurality of the reinforcing ribs of the reinforcing structure are transverse ribs perpendicular to the longitudinal ribs. The plurality of individual feed ducts and/or the plurality of individual return ducts can then in each case be embedded individually in the transverse ribs at least in places. Alternatively or additionally, the plurality of individual feed ducts and/or the plurality of individual return ducts can be fixed on the first housing part and form the reinforcing ribs of the reinforcing structure.

In order to be able to conduct the coolant into the ducted structure and out of the ducted structure, it is advantageously provided that the ducted structure has a coolant inlet and a coolant outlet. The coolant can then flow through the coolant inlet into the at least one distributing feed duct and flow out of the at least one collecting return duct. A coolant connector, which protrudes from the first housing part, can in each case be fixed, in a coolant leakproof fashion, on the coolant inlet and/or on the coolant outlet. The ducted structure can be connected via the respective coolant connectors to external components such as, for example, a coolant cooler or a heater or a coolant pump in a coolant-conducting fashion.

In order to be able to incorporate the temperature-control units of the respective battery modules in the ducted structure, it is advantageously provided that the plurality of individual feed ducts each have an inlet connector. The inlet connectors can then connect the plurality of individual feed ducts in each case individually to an inlet of the respective temperature-control unit in a coolant-conducting fashion. It is moreover provided that the plurality of individual return ducts in each case have an outlet connector, wherein the outlet connectors can connect the plurality of individual return ducts in each case individually to an outlet of the respective temperature-control unit in a coolant-conducting fashion.

In order to be able to decouple the respective temperature-control units from the ducted structure when the battery modules are dismounted, it is provided that the respective inlet connectors and/or the respective outlet connectors in each case have a non-return valve. The non-return valves can here be designed in such a way that, when the battery modules are dismounted, the respective individual feed duct and the respective individual return duct are closed in a coolant leakproof fashion. In this way, when the battery module is dismounted, the coolant cannot flow out of the ducted structure and damage to the battery modules is advantageously prevented.

In order to prevent leakage of the coolant in the ducted structure, it is advantageously provided that the respective inlet connectors and/or the respective outlet connectors in each case have a seal by means of which a connection point between the respective inlet connector or the respective outlet connector and the respective individual feed duct or the respective individual return duct is sealed. In this way, damage to the battery modules during operation as well can be prevented, in particular in the event of vibration or shaking.

It is advantageously provided that the reinforcing ribs of the reinforcing structure have a framework-like design at least in places. Thus, the reinforcing ribs can, for example, be configured in the reinforcing structure in the manner of a framework with cooling ducts that are embedded only in places, or alternatively without the cooling ducts in order to reduce the dead weight of the battery housing. The reinforcing structure can both be fixed on the first housing part positively, non-positively or via a material bond and alternatively be designed integrally with the first housing part. The battery housing can moreover be made from a metal or a plastic.

It is provided that the first housing part or the second housing part can be fixed on a floor panel of the electric or hybrid vehicle. The ducted structure is fixed in the first housing part and the battery modules of the traction battery can be fixed in the first housing part. If the first housing part is fixed on the floor panel of the electric or hybrid vehicle, the individual battery modules can be replaced individually without removing the traction battery. Maintenance of the traction battery is considerably simplified as a result.

In the battery housing according to the invention, the cooling ducts of the ducted structure are embedded at least in places in the reinforcing ribs of the reinforcing structure so that the amount of structural space required for the ducted structure is considerably reduced. The battery housing can consequently have a more compact and lighter design. The battery housing according to the invention can moreover be manufactured in a manner which saves on materials and costs in comparison with a conventional battery housing.

The invention also relates to a traction battery, in particular for an electric or hybrid vehicle. The traction battery here has a battery housing with a first housing part and a second housing part and can be fixed to a floor panel of the electric or hybrid vehicle. According to the invention, the battery housing of the traction battery is designed as described above. The traction battery can here have a plurality of battery modules fixed in the battery housing, each with a temperature-control unit, wherein the respective temperature-control unit is fixed on the first housing part and is connected to a ducted structure of the battery housing in a coolant-conducting manner.

Other important features and advantages of the invention become apparent from dependent claims, the drawings and the associated description of the Figures with the aid of the drawings.

It should be understood that the abovementioned features and those which will be explained below can be used not only in the combination stated in each case but also in other combinations, or alone, without going beyond the scope of the present invention.

Preferred exemplary embodiments of the invention are shown in the drawings and are explained in detail in the following description, wherein identical reference numerals refer to identical or similar or functionally identical components.

BRIEF DESCRIPTION OF THE DRAWINGS

In the drawings, each of which is schematic.

DETAILED DESCRIPTION

Figure 1:
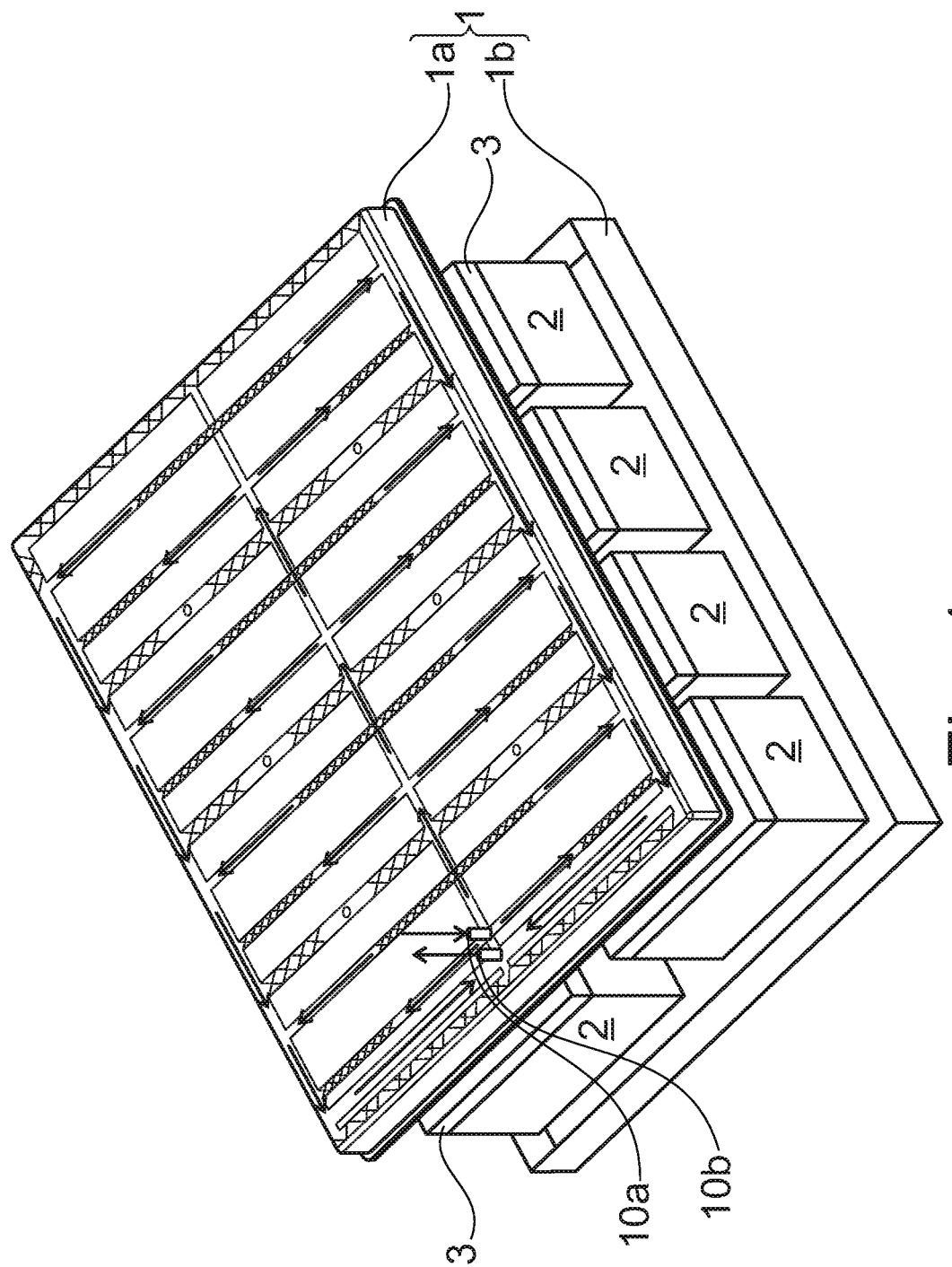
FIG. 1 shows an exploded view of a battery housing according to the invention with a plurality of battery modules.
Figure 2:
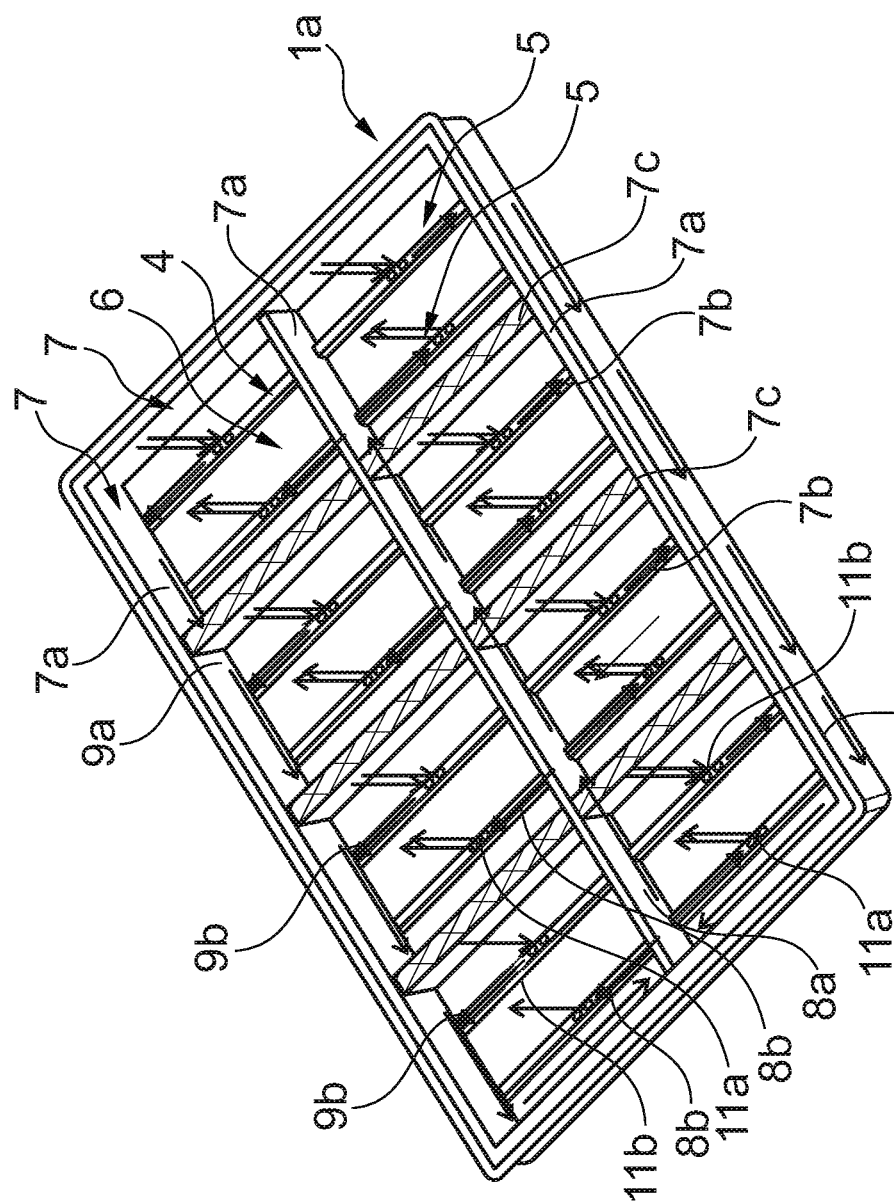
FIG. 2 shows a view of the first housing part shown in FIG. 1, with an embedded ducted structure, from the inside.

FIG. 1 shows an exploded view of a battery housing 1 according to the invention with a first housing part 1a and a second housing part 1b. A view of the first housing part 1a from the inside is shown in FIG. 2. The first housing part 1a and the second housing part 1b can be removably fixed to each other so that individual battery modules 2, each with a temperature-control arrangement 3, can be fixed in the battery housing 1 and extracted from the battery housing 1. The first housing part 1 has a ducted structure 4 with a plurality of coolant ducts 5 and an integrally designed reinforcing structure 6 with a plurality of reinforcing ribs 7. The ducted structure 4 is here integrated into the reinforcing structure 6 and the coolant ducts 5 are embedded into the reinforcing ribs 7.

The respective battery modules 2 with the temperature-control unit 3 can be fixed on the first housing part 1a so that the temperature-control units 3 of the battery modules 2 can be incorporated into the ducted structure 4. For this purpose, the coolant ducts 5 of the ducted structure 4 are designed as a distributing feed duct 8a, individual feed ducts 8b, collecting return ducts 9a and individual return ducts 9b. The distributing feed duct 8a here leads into the individual feed ducts 8b and the individual return ducts 9b open into the collecting return ducts 9a. The distributing feed duct 8a and the two collecting return ducts 9a are here embedded into a respective longitudinal rib 7a of the reinforcing structure 6. The individual feed ducts 8b and the individual return ducts 9b are in each case embedded in a transverse rib 7b of the reinforcing structure 6. In addition, the reinforcing structure also has individual framework-like transverse ribs 7c with no embedded coolant ducts 5 which additionally reinforce the first housing part.

In the ducted structure 4, a coolant from a coolant inlet 10a flows first through the distributing feed duct 8a and is conducted into the individual feed ducts 8b, as shown by arrows. The coolant is conducted from the individual feed ducts 8b via inlet connectors 11a into the temperature-control units 3. The respective battery modules 2 can then be heated or cooled by the coolant in the temperature-control units 3. The coolant flows from the temperature-control units 3 via outlet connectors 11b into the individual return ducts 9b. The individual return ducts 9b open into the lateral collecting return ducts 9a and the coolant is conducted from the ducted structure 4 via a coolant outlet 10b.

In the battery housing 1 according to the invention, the cooling ducts 5 of the ducted structure 4 are embedded in the reinforcing ribs 7 of the reinforcing structure 6. The ducted structure 4 is thus integrated into the reinforcing structure 6 and the structural space required for the ducted structure 4 in the battery housing 1 is advantageously reduced. The battery housing 1 according to the invention has a more compact and lighter design in comparison with a conventional battery housing.

The invention claimed is:

1. A battery housing for a traction battery having a plurality of battery modules each with a temperature-control unit, the battery housing comprising:
    a first housing part and a second housing part fixed removably to each other and spaced apart to define a space in which the plurality of battery modules is disposed, the battery modules being fixable on the first housing part;
    a reinforcing structure having a plurality of reinforcing ribs reinforcing the first housing part; and
    a ducted structure with a plurality of coolant ducts for a coolant fixed on the first housing part;
    wherein a subset of the plurality of coolant ducts form individual feed ducts and individual return ducts;
    wherein (i) each temperature-control unit is disposed between the respective battery module and the first housing part relative to a direction extending from the first housing part to the second housing part and (ii) each individual feed duct and each individual return duct is connectable to a respective temperature-control unit of an associated battery module from above such that the coolant is flowable from one of the individual feed ducts downwards to the respective temperature-control unit in a direction towards the second housing part and transverse to the one of the individual feed ducts, through the respective temperature-control unit to one of the individual return ducts upwards in a direction towards the first housing part and transverse to the one of the individual return ducts; and
    wherein at least one of the coolant ducts is at least partially embedded in one of the reinforcing ribs.

2. The battery housing according to claim 1, wherein:
    at least two of the coolant ducts form at least one distributing feed duct and at least one collecting return duct;

the at least one distributing feed duct leads into the individual feed ducts; and
the individual return ducts open into the at least one collecting return duct.

3. The battery housing according to claim 2, wherein:
a subset of the plurality of reinforcing ribs are longitudinal ribs; and
at least one of the at least one distributing feed duct and the at least one collecting return duct is embedded at least partially in one of the longitudinal ribs.

4. The battery housing according to claim 2, wherein:
the ducted structure has a coolant inlet through which the coolant flows into the at least one distributing feed duct; and
the ducted structure has a coolant outlet through which the coolant flows out of the at least one collecting return duct.

5. The battery housing according to claim 4, further comprising a coolant connector protruding from the first housing part and fixed, in a coolant leakproof fashion, on at least one of the coolant inlet and the coolant outlet.

6. The battery housing according to claim 2, wherein the distributing feed duct runs longitudinally through a center of the ducted structure, and the at least one collecting return duct includes two collecting return ducts running longitudinally on opposing sides of the distributing feed duct, each individual feed duct and each individual return duct extending transversely between the distributing feed duct and one of the two collecting return ducts.

7. The battery housing according to claim 1, wherein:
a subset of the plurality of reinforcing ribs are longitudinal ribs, and another subset of the plurality of the reinforcing ribs are transverse ribs perpendicular to the longitudinal ribs; and
at least one of the individual feed ducts and the individual return ducts is at least partially embedded individually in the transverse ribs.

8. The battery housing according to claim 1, wherein at least one of the individual feed ducts and the individual return ducts are fixed on the first housing part and form the reinforcing ribs.

9. The battery housing according to claim 1, wherein:
each individual feed duct has an inlet connector by which each individual feed duct is connectable to an inlet of the respective temperature-control unit; and
each individual return duct has an outlet connector by which each individual return duct is connectable to an outlet of the respective temperature-control unit.

10. The battery housing according to claim 9, wherein at least one of the inlet connector and the outlet connector in each case has a non-return valve.

11. The battery housing according to claim 9, wherein at least one of the inlet connector and the outlet connector in each case has a seal by which a connection point between the inlet connector and the individual feed duct or between the outlet connector and the individual return duct is sealed.

12. The battery housing according to claim 1, wherein one of:
the first housing part is fixed on a floor panel of an electric or hybrid vehicle; or
the second housing part is fixed on the floor panel of the electric or hybrid vehicle.

13. The battery housing according to claim 1, wherein each temperature-control unit is disposed on a single face of the respective battery module that faces the first housing part.

14. The battery housing according to claim 1, wherein:
the plurality of reinforcing ribs includes a plurality of longitudinal ribs and a plurality of transverse ribs;
the plurality of transverse ribs extend between and connect adjacent longitudinal ribs;
the plurality of transverse ribs project from the first housing part toward the temperature-control unit of an associated battery module of the plurality of battery modules; and
the plurality of individual feed ducts and the plurality of individual return ducts are at least partially embedded in the plurality of transverse ribs.

15. The battery housing according to claim 14, wherein the plurality of transverse ribs are disposed between the associated battery module and the first housing part relative to a direction extending from the first housing part to the second housing part.

16. The battery housing according to claim 14, wherein:
the plurality of reinforcing ribs further includes a plurality of framework-like transverse ribs disposed between and separating adjacent battery modules; and
the plurality of framework-like transverse ribs are free of embedded coolant ducts.

17. The battery housing according to claim 16, wherein the plurality of framework-like transverse ribs extend further from the first housing part than the plurality of transverse ribs.

18. A traction battery, comprising:
a battery housing having:
a first housing part and a second housing part fixed removably to each other;
a reinforcing structure having a plurality of reinforcing ribs reinforcing the first housing part; and
a ducted structure with a plurality of coolant ducts for a coolant fixed on the first housing part; and
a plurality of battery modules fixed in the battery housing, each battery module having a temperature-control unit on top of the respective battery module, and each battery module being fixed on the first housing part, each temperature-control unit being connected to the ducted structure of the battery housing in a coolant-conducting manner;
wherein a subset of the plurality of coolant ducts form individual feed ducts and individual return ducts, each individual feed duct and each individual return duct passing over and being connected to a respective temperature-control unit such that the coolant is flowable from one of the individual feed ducts downwards to the respective temperature-control unit in a direction transverse to the one of the individual feed ducts, through the respective temperature-control unit to one of the individual return ducts in a direction transverse and upwards to the one of the individual return ducts;
wherein at least one of the coolant ducts is at least partially embedded in one of the reinforcing ribs;
wherein the traction battery is fixable to a floor panel of an electric or hybrid vehicle; and
wherein each temperature-control unit is disposed between the respective battery module and the first housing part relative to a direction extending from the first housing part to the second housing part.

19. A battery housing for a traction battery having a plurality of battery modules each with a temperature-control unit, the battery housing comprising:
a first housing part and a second housing part fixed removably to each other and spaced apart to define a space in which the plurality of battery modules is disposed, the battery modules being fixable on the first housing part;

a reinforcing structure having a plurality of reinforcing ribs reinforcing the first housing part;

a ducted structure with a plurality of coolant ducts for a coolant fixed on the first housing part;

wherein the plurality of coolant ducts are connectable to the temperature-control unit of each of the plurality of battery modules in a coolant-conducting fashion;

wherein a subset of the coolant ducts form individual feed ducts and individual return ducts, wherein the coolant is flowable from one of the individual feed ducts to the respective temperature-control unit downwards in a direction towards the second housing part and transverse to the one of the individual feed ducts, through the respective temperature-control unit to one of the individual return ducts upwards in a direction towards the first housing part and transverse to the one of the individual return ducts;

wherein at least two of the coolant ducts form at least one distributing feed duct and at least one collecting return duct, wherein the at least one distributing feed duct leads into the individual feed ducts, and the individual return ducts open into the at least one collecting return duct;

wherein the distributing feed duct runs longitudinally through a center of the ducted structure, and the at least one collecting return duct includes two collecting return ducts running longitudinally on opposing sides of the distributing feed duct, each individual feed duct and each individual return duct extending transversely between the distributing feed duct and one of the two collecting return ducts;

wherein each individual feed duct has an inlet connector by which each individual feed duct is connectable to an inlet of the respective temperature-control unit, the inlet connector extending downward from the respective individual feed duct in the direction transverse to the respective individual feed duct towards the respective temperature-control unit;

wherein each individual return duct has an outlet connector by which each individual return duct is connectable to an outlet of the respective temperature-control unit, the outlet connector extending downward from the respective individual return duct in the direction transverse to the respective individual return duct towards the respective temperature-control unit;

wherein the plurality of reinforcing ribs includes a plurality of longitudinal ribs and a plurality of transverse ribs, the plurality of transverse ribs extending between adjacent longitudinal ribs and projecting from the first housing part toward the temperature-control unit of an associated battery module of the plurality of battery modules;

the plurality of individual feed ducts and the plurality of individual return ducts are at least partially embedded in the plurality of transverse ribs; and wherein each temperature-control unit is disposed between the respective battery module and the first housing part relative to a direction extending from the first housing part to the second housing part.

20. The battery housing according to claim 19, wherein at least one of the at least one distributing feed duct and the at least one collecting return duct is embedded at least partially in one of the plurality of longitudinal ribs.

* * * * *